US 6,402,817 B1

(12) United States Patent
Bergman (10) Patent No.: US 6,402,817 B1
(45) Date of Patent: Jun. 11, 2002

(54) LOW PRESSURE DROP, MULTI-SLIT VIRTUAL IMPACTOR

(75) Inventor: Werner Bergman, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/648,065

(22) Filed: Aug. 25, 2000

(51) Int. Cl.$^7$ .............................................. B01D 45/00
(52) U.S. Cl. .......................... 95/267; 55/434; 73/28.05; 73/863.22
(58) Field of Search .......................... 73/28.05, 863.22; 95/267; 55/434; 209/143

(56) References Cited

U.S. PATENT DOCUMENTS

| | | | |
|---|---|---|---|
| 4,132,894 A | 1/1979 | Yule | 250/435 |
| 4,301,002 A | 11/1981 | Loo | 209/143 |
| 4,452,068 A | 6/1984 | Loo | 73/28 |
| 4,581,046 A | 4/1986 | Bergman | 55/131 |
| 4,623,365 A | 11/1986 | Bergman | 55/131 |
| 4,670,135 A | 6/1987 | Marple et al. | 509/143 |

(List continued on next page.)

OTHER PUBLICATIONS

R. F. Hounam and R. J. Sherwood, "The Cascade Centripeter: A Device for Determining the Concentration and Size Distribution of Aerosols," American Industrial Hygiene Assoc. Journal, 26, pp 122–131, 1965.

William D. Conner, "An Inertial–Type Particle Separator for Collecting Large Samples," Journal of the Air Pollution Control Association, 16, pp. 35–38, 1966.

Larry J. Forney, "Aerosol fractionator for large–scale sampling," Rev. Sci. Instrum., vol. 47, No. 10, pp. 1264–1269, Oct. 1976.

Larry J. Forney et al, "Experimental and Theoretical Study of a Two–Dimensional Virtual Impactor," Environ, Sci. Technol., vol. 16, No. 8, pp. 492–497, (1982).

B. T. Chen et al, "Performance of a Modified Virtual Impactor," Aerosol Science and Technology 5:369–376, (1986).

B. T. Chen and H. C. Yeh, "An Improved Virtual Impactor: Design and Performance," J. Aerosol Sci., vol. 18, No. 2, pp. 203–214, (1987).

B. T. Chen et al, "Use of Two Virtual Impactors in Series as an Aerosol Generator," J. Aerosol Sci., vol. 19, No. 1, pp. 137–146, (1988).

Billy W. Loo and Christopher P. Cork, "Development of High Efficiency Virtual Impactors," Aerosol and Technology, 9:167–176, (1988).

Virgil A. Marple et al, "High–volume Impactor for Sampling Fine and Coarse Particles," J. Air Waste Manage. Assoc. 40:762–767 (1990).

Virgil A. Marple et al, "Inertial, Gravitational, Centrifugal, and Thermal Collection Techniques," Aerosol Measurement Principles, Techniques, and Applications, edited by Klaus Willeke and Paul A. Baron, Van Nostrand Reinhold, New York, pp. 206–232, ISBN 0–442–00486–9, 1993.

C. Sioutas et al, "Development of a Low Cutpoint Slit Virtual Impactor for Sampling Ambient Fine Particles," J. Aerosol Sci., vol. 25, No. 7, pp. 1321–1330, (1994).

Constantinos Sioutas et al, "A High–volume Small Cutpoint Virtual Impactor for Separation of –Atmospheric Particulate from Gaseous Pollutants," Particulate Science and Technology, 12:207–221, (1994).

(List continued on next page.)

*Primary Examiner*—Robert A. Hopkins
(74) *Attorney, Agent, or Firm*—Eddie E. Scott; Alan H. Thompson (57) ABSTRACT

Fluid flow is directed into a multiplicity of slit nozzles positioned so that the fluid flow is directed into a gap between the nozzles and (a) a number of receiving chambers and (b) a number of exhaust chambers. The nozzles and chambers are select so that the fluid flow will be separated into a first particle flow component with larger and a second particle flow component with the smaller particles.

16 Claims, 6 Drawing Sheets

U.S. PATENT DOCUMENTS

| | | | |
|---|---|---|---|
| 4,689,052 A | 8/1987 | Ogren et al. | 55/17 |
| 4,767,524 A | 8/1988 | Yeh et al. | 209/143 |
| 5,006,227 A | 4/1991 | Behm et al. | 209/143 |
| 5,040,424 A | 8/1991 | Marple et al. | 73/863.23 |
| 5,183,481 A | 2/1993 | Felder | 55/15 |
| 5,425,802 A | 6/1995 | Burton et al. | 95/32 |
| 5,498,271 A | 3/1996 | Marple et al. | 55/321 |
| 5,533,406 A | 7/1996 | Geise | 73/863.22 |
| 5,773,710 A | 6/1998 | Squirrell | 73/28.01 |
| 5,788,741 A | 8/1998 | Burton et al. | 95/32 |
| 5,800,598 A | 9/1998 | Chein et al. | 96/190 |
| 5,855,652 A | 1/1999 | Talley | 96/44 |
| 5,858,043 A | 1/1999 | Geise | 55/462 |
| 5,918,259 A | 6/1999 | Squirrell | 73/28.01 |
| 6,062,392 A * | 5/2000 | Birmingham et al. | 209/143 |
| 6,120,573 A * | 9/2000 | Call et al. | 55/442 |

OTHER PUBLICATIONS

C. Sioutas et al, "Development and Evaluation of a Prototype Ambient Particle Concentrator for Inhalation Exposure Studies," Inhalation Toxicology, 7:633–644, (1995).

Constantinos Sioutas et al, "A Technique to Expose Animals to Concetrated Fine Ambient Aerosols," Environmental Health Perspectives, vol. 103, No. 2, pp. 172–177, Feb. 1995.

Constantinos Sioutas et al, "Fine Particle Concentrators for Inhalation Exposures–Effect of Particle Size and Composition,"J. Aerosol Sci. vol. 28, No. 6, pp. 1057–1071, (1997).

Shou–Nan Li and Dale A. Lundgren, "Effect of Clean Air Core Geometry on Fine Particle Contamination and Calibration of a Virtual Impactor," Aerosol Science and Technology, 27:625–635, (1997).

* cited by examiner

LOW PRESSURE DROP, MULTI-SLIT VIRTUAL IMPACTOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to inertial classifiers, and more particularly, to a virtual impactor. The virtual impactor system of the present invention will separate a fluid stream into a first particle flow component containing particles essentially greater than a selected size and a second particle flow component containing particles essentially smaller than the selected size.

2. State of Technology

Impactors belong to a class of instruments called inertial classifiers, which separate particles in a fluid stream based on the inertia of particles. In general these instruments operate by forcing a change in the direction of the fluid stream containing the particles. Because of the particles inertia the particles cannot follow the fluid stream. If an obstacle is placed in the path of the fluid stream, the fluid is deflected around the obstacle while the particles are less able to deflect around the obstacle. If the particle inertia exceeds a minimum quantity, the particle cannot deflect around the obstacle and will be caught by the obstacle.

The most common inertial classifiers are cyclones, impactors, and virtual impactors. A cyclone operates by forcing an air stream tangentially into a cylinder causing it to circulate around the cylinder. Particles in the air stream having sufficient inertia will collide with the interior wall. Impactors operate by directing a jet or jets of air against a relatively flat surface perpendicular to the air jet or jets. Particles suspended in the air and with sufficient inertia will impact on the flat surface.

For virtual impactors, the air stream is directed at a relatively stagnant air space that acts as a virtual surface. In this case the particles remain suspended in the air as they impact into a relatively stagnant air or low flow space. This low flow stream provides an enriched concentration of the larger size particles for subsequent treatment or sampling.

U.S. Pat. No. 5,425,802, patented Jun. 20, 1995, to Robert M. Burton, et al, assigned to The United States of American as represented by the Administrator of Environmental Protection Agency and President and Fellows of Harvard, shows a virtual impactor for removing particles from an airstream. The virtual impactor comprises nozzle means for accelerating an entering airstream, particle receiving means positioned downstream from the nozzle means, and a chamber in fluid communication with the gap between the nozzle means and the receiving means. The nozzle means comprises an inlet and an elongated outlet having a width dimension of between about 0.007 and 0.010 inches, and further having a longitudinal axis normal to and passing through the center of the elongated outlet. The particle receiving means comprises an elongated inlet having a width dimension of between about 0.013 and 0.015 inches and an outlet and further has a longitudinal axis normal to and passing through the center of the elongated inlet. The particle receiving means is positioned downstream from the outlet of the nozzle means so that the flow gap therebetween is between about 0.008 and 0.012 inches, and is further positioned so that the longitudinal axis of the nozzle means and the longitudinal axis of the receiving means are substantially coaxial and so that the width dimension of the nozzle means outlet and the width dimension of the receiving means inlet are substantially parallel. The chamber is configured to be in fluid communication with a vacuum source, as is the outlet of the particle receiving means.

U.S. Pat. No. 5,040,424, patented Aug. 20, 1991, to Virgil A. Maple, et al, assigned to Regents of the University of Minnesota, shows a high-volume aerosol sampling inlet housing which provides smooth inlet flow to a 10 micron classification device in a high volume flow. The high volume sampler with which the inlet is used establishes a high flow, for example, 40 cubic feet per minute. The air flow into the inlet has a standard 40 cubic feet per minute leading to the high volume sampler which requires a secondary inlet flow of about two cubic feet per minute needed for particle classification. The two cubic feet per minute flow is exhausted at a separate outlet and is not connected to the standard high volume sampler. Thus, a total flow of 42 cubic feet per minute enters the inlet. The entrance opening to the inlet is an annular opening below a dome cover. Screens are provided to keep any bugs or large debris from entering the inlet housing. The debris-free air flow is passed through the desired impactor device, and the large particles will be collected with the secondary outlet flow of only two cubic feet per minute while the smaller particles are carried out by the major flow of 40 cfm to the high volume sampler filter placed below. The larger particles are thus inertially separated from the major flow and are flushed by the smaller secondary or minor flow. The major flow through to the high volume sampler is maintained at the standard 40 cubic feet per minute. The particles in the inlet air stream are separated into size classifications larger and smaller than 10 microns. The large particles that are flushed out with the two cubic feet per minute flow can either be removed from the air stream by a second filter, or analyzed in a conventional impactor or some other device, or may be allowed to pass through the air pump and be blown back into the atmosphere.

U.S. Pat. No. 5,183,481, patented Feb. 2, 1993, to William Felder, assigned to Aerochem Research Laboratories, Inc., shows a supersonic virtual impactor. A supersonic gas flow is employed with a virtual impactor to separate fine particles completely from the gas. The carrying gas and fine particles are accelerated to supersonic speeds and then impacted against a virtual impactor. When the supersonic stream strikes the virtual impactor, a shock wave forms in the gas stream near the impactor surface. The carrying gas turns sharply away while the particles in the gas stream, carried by their inertia, continue in their original direction and pass into the virtual impactor. On the downstream side of the virtual impactor surface, a non-contaminating inert gas maintains a pressure equal to or greater than the pressure of the carrying gas between the virtual impactor surface and the shock wave.

Hounam and Sherwood described the use of two stages of multi-jet virtual iimpactors using round jets for generating relatively monodisperse particles from a heterodisperse input (R. F. Hounam and R. J. Sherwood "The cascade Centripeter: a device for determining the concentration and size distribution of aerosols" American Industrial Hygiene Assoc. J, 26, pp 122–131, 1965). The relatively monodisperse particles were sampled from the minor flow stream in the second virtual impactor. Another example of using two virtual impactors for size fractionated aerosol samples is given by Chen et al (B. T. Chen et al "Use of two virtual impactors in series as an aerosol generator" J. Aerosol Science, 19, pp 137–146, 1988). Marple et al describe an air sampler having two stages of virtual impaction in U.S. Pat. No. 5,040,424 and European patent EU 0 352 126 A2. The two stages of virtual impaction are used for separating particles of different size. Another multi-stage virtual impactor for separating particles into different size ranges was described by Brenizer et al in internationalpatent WO 99/26464. The pressure drop across a multi-stage virtual impactor increases with each additional stage.

Yule described the use of a multi-jet, multi stage virtual impactor using round jets for concentrating particles in U.S. Pat. No. 4,132,894. Burton et al described multi-stage virtual impactors with slit jets to increase the aerosol concentration of a given size in U.S. Pat. Nos. 5,425,802 and 5,788,741 and in international patent WO 94/25141. Sioutas et al further described the use of multi-stage slit impactors for concentrating particles (C. Sioutas et al "Development and evaluation of a prototype ambient particle concentrator for inhalation exposure studies, Inhalation Toxicology, 7, 633–644, 1995; C. Sioutas et al "A technique to expose animal to concentrated fine ambient aerosols". Environmental Health Perspectives, 103, 172–177, 1995; C. Sioutas et al "Fine particle concentrators for inhalation exposures- effect of particle size and comoposition, J Aerosol Sci, 28, 1057–1071, 1997).

SUMMARY OF THE INVENTION

The present invention provides a system for separating a fluid flow into a first particle flow component containing first size particles essentially greater than a selected size and a second particle flow component containing second sized particles essentially smaller than the selected size. In one embodiment of the invention the fluid flow is directed into a number of slit nozzles. The slit nozzles are positioned so that the fluid flow is directed into a gap between the nozzles and (a) a number of receiving chamber inlets leading into receiving chambers and (b) a number of exhaust chambers. The receiving chambers are in alignment with the slit nozzles. The exhaust chambers are located offset from the aligned slit nozzles and receiving chambers. The size of the slit nozzles, the gaps, and the receiving chamber inlets are selected so that the fluid flow will be separated into (a) the first particle flow component with said larger particles which is directed into the receiving chambers, and (b) the second particle flow component with the smaller particles which is directed into the exhaust chambers.

In a preferred embodiment of the invention, a virtual impactor system is provided for dividing a particle containing gas flow into (a) a small flow component with a small portion of the gas flow that carries particles essentially greater than a predetermined size and (b) a large flow component with a large portion of the gas flow that carries particles essentially less than the predetermined size. The gas can be either air or other gases. The virtual impactor system can also utilize fluids other than gas, for example liquids.

The virtual impactor system includes multiple nozzles for accelerating and channeling the fluid stream and multiple receivers positioned downstream from the nozzles. The nozzles are located so that each receiver has a substantially common axis with a corresponding nozzle. The receivers are separated from the nozzles by gaps. The virtual impactor system also includes multiple exhaust chambers in fluid communication with the gaps between the nozzles and the receivers. The multiple exhaust chambers are sandwiched alternately between the multiple receivers. The nozzles have an elongated outlet, with the nozzle outlet positioned to direct the accelerated fluid flow into the receivers in an approximate straight line.

In one embodiment of the invention the receivers have an elongated inlet and outlet, with the outlet of the receivers directed downstream. The receivers will contain the large particle flow component. The fluid exhaust chambers each comprise a chamber having an elongated inlet in fluid communication with the neighboring gaps between the nozzle outlet and the receiving inlet and are located approximately parallel to the receivers. The fluid exhaust chambers will contain the small particle flow component. The fluid exhaust chambers have an outlet at one or both of the narrow sides of the exhaust chamber, the narrow sides being at approximately right angles to the inlet of the exhaust chamber. The fluid exhaust chambers have a sealed side that is opposite the inlet, thereby directing the small particle flow component from the inlet to the side exhaust.

A fluid flow device is used to drive the fluid through the multiple nozzles and out from the outlets of the receivers and the outlets of the multiple exhaust chambers. The fluid flow device may consist of a first vacuum fluidly connected to the outlets of the receivers and a second vacuum fluidly connected to the outlets of the multiple exhaust chambers.

Accordingly, it is an aspect of the present invention to overcome the deficiencies in the prior art and provide a virtual impactor system that has a simple geometry, high fluid flow, and low pressure drop.

Another aspect of the present invention is to provide a system for separating and concentrating larger particles from a fluid stream using a virtual impactor that has a simple geometry, high fluid flow, and low pressure drop.

Another aspect of this invention is a method for separating and concentrating large particles from a fluid stream using the virtual impactor system described herein.

An additional aspect of the present invention is to provide a micro-machined virtual impactor system having high fluid flow and low pressure drop.

An additional aspect of the present invention is to provide a virtual impactor system that is easier to construct using a micro-machining technology.

An additional aspect of this invention is a micro-machined virtual impactor apparatus using the virtual impactor system design described herein.

Additional aspects, advantages, and features of the invention are set forth in part in the description which follows. Various aspects, advantages, and features of the invention will become apparent to those skilled in the art upon examination of the description and by practice of the invention.

BRIEF DESCRIPTION OF THE DRAWINGS

FIG. 1. is a perspective, partially sectioned, view of one embodiment of a virtual impactor system constructed in accordance with the invention.

FIG. 2. is a sectional, schematic view of the end portion of the virtual impactor shown in FIG. 1.

FIG. 3. is an exploded view of the designated region of the virtual impactor shown in FIG. 2 illustrating the accelerating nozzle, receiving chamber, and exhaust chamber.

FIG. 4. is a sectional view of the exhaust chamber taken along the lines A—A of FIG. 2.

FIG. 5 is a perspective view of an 8"×8"×1" virtual impactor.

FIG. 6 shows graphs of the test results of the collection efficiency of a particle collection device with and without the multi-slit virtual impactor.

DETAILED DESCRIPTION OF THE INVENTION

Referring now to the drawings, and more particularly to FIGS. 1, 2, 3, and 4, an embodiment of a multi-slit virtual impactor is described to illustrate the virtual impactor system of the present invention. Virtual impactor consists of multiple accelerating nozzle assembly 2, multiple receiving chambers 20, and multiple exhaust chambers 21. The virtual impactor divides a particle containing gas flow into a small flow component carrying particles essentially greater than a predetermined size and a large flow component carrying particles essentially less than the predetermined size. The virtual impactor system of the present invention can operate using fluids other than gas, for example liquids.

Figure 1:
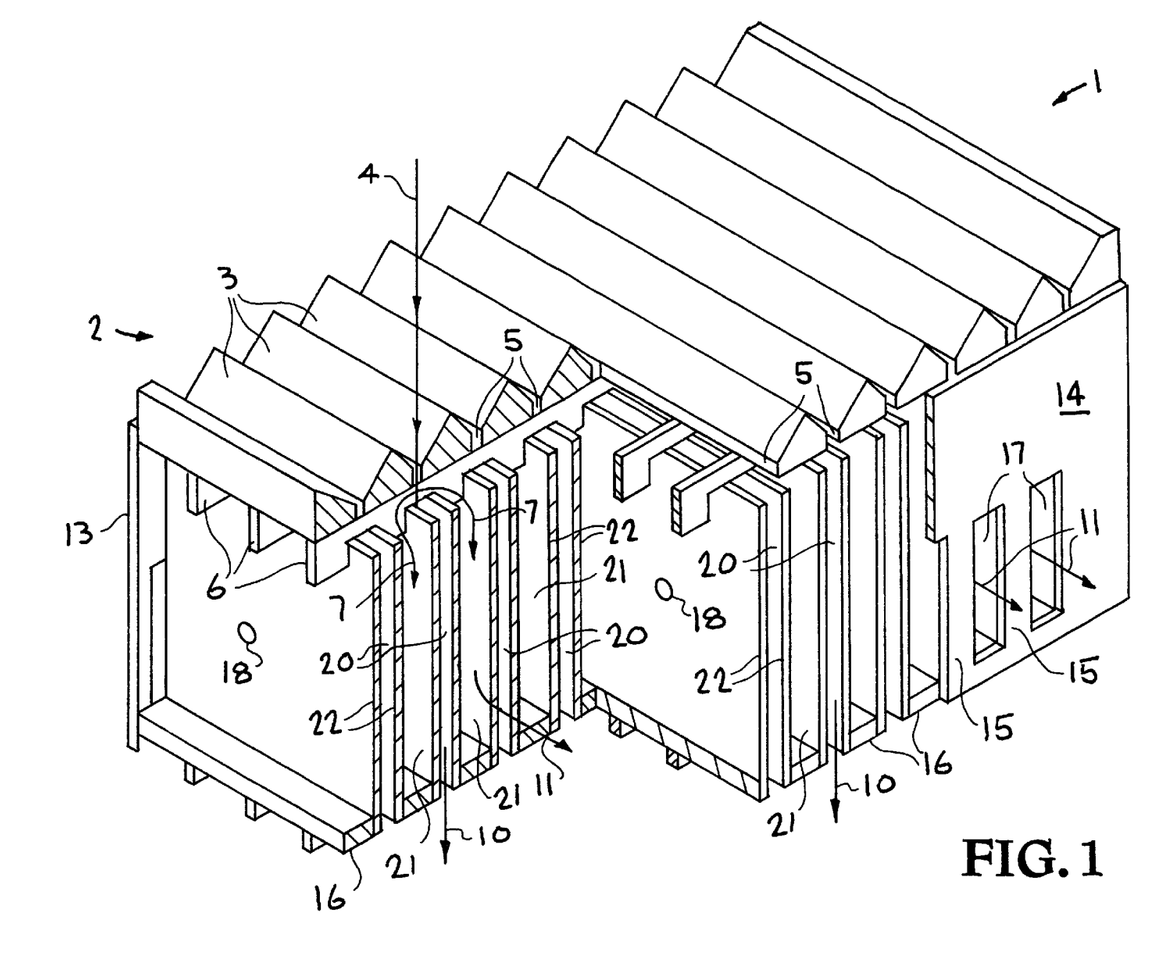
Figure 2:
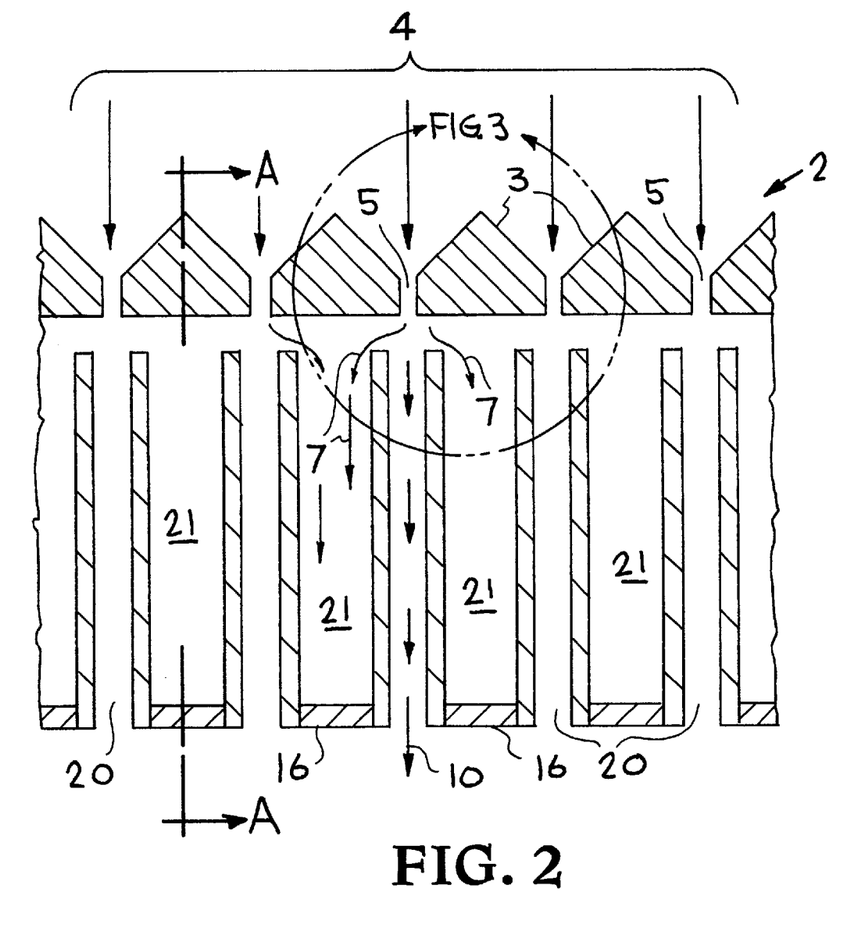
Figure 3:
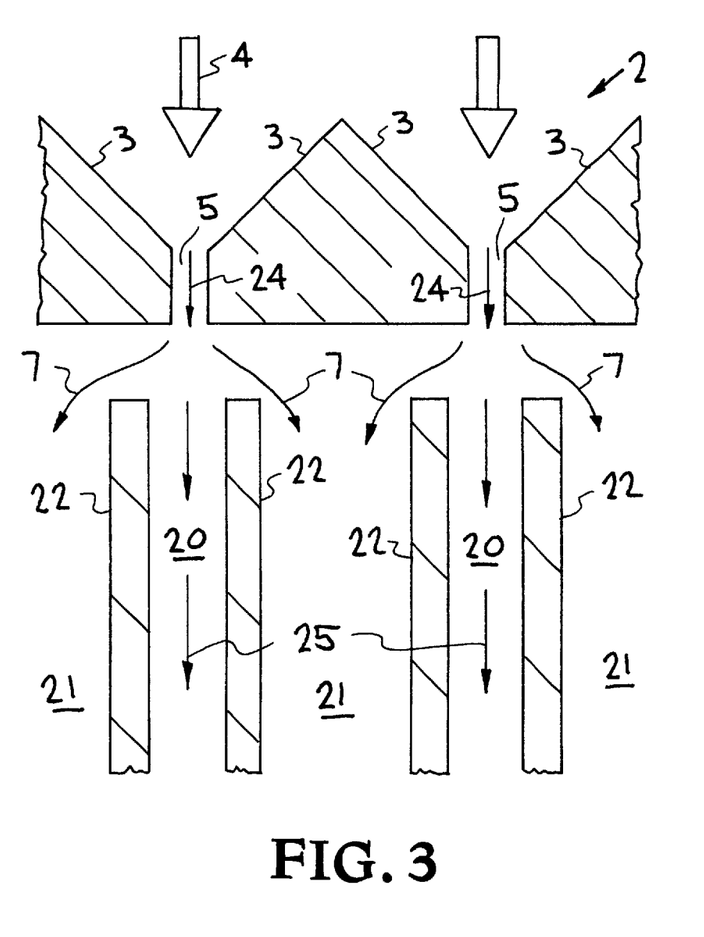

As shown in FIGS. 1, 2, and 3, the inlet gas flow 4 containing particles approaches the multiple accelerating nozzle assembly 2 and is focused on the nozzle slits 5 by the beveled sides 3 which provide a smooth transition to the narrow slit nozzles 5. The purpose of the accelerating nozzles 5 is to provide a higher velocity jet of air directed into the receiving chambers 20.

The receiving chambers 20 are in-line with the accelerating jets and are separated from the jets by an air gap which is typically 1 to 3 times the width of the accelerating nozzle 5. The inlet width of the receiving chamber 20 is typically 1.3 to 1.5 times the width of the accelerating nozzles 5 and will capture the accelerated jet.

Notched retaining guides 6 align the receiving chambers 20 with the accelerating nozzles 5 and provide the air gaps between the accelerating nozzles 5 and the receiving chambers 20. The receiving chambers 20 are defined by the thin plates 22 and by the end plates 13 and 14. The end plates 13 and 14 cover both the receiving chambers 20 and the exhaust chambers 21 in the inlet portion of the two types of chambers. Slots 17 are cut in the end plates toward the exit side of the exhaust chambers. The end plates 13 and 14 still covering the entire receiving chamber with the strips 15. The receiving plates 22 maintain their separation by means of dimples pressed in one or both of the plates. These dimples, not shown in FIG. 1, present little resistance to the air and particle flow in the receiving chamber. Other devices, such as spacers can also provide the separation function.

The outlet end of the receiving chamber is open to allow the product flow 10 to pass through the chamber. The thin plates 22 are held in place at the exit of the receiving chamber by the retaining strips 16. Holes 18 allow bolts or other devices for aligning and securing the multiple plates 22.

Because the air flow through the receiving chambers 20 is much less than the air flow through the accelerating nozzles 5, most of the air flow from the accelerating nozzles will be deflected around the receiving chambers 20 and into the exhaust chambers 21.

A flow control device, not shown in FIG. 1, controls the air flow through the receiving and exhaust chambers. FIG. 1 shows the deflected air flows as arrows 7. Particles having an inertia greater than a given amount will not be able to deflect around the receiving chambers 20 and will be trapped in the receiving chambers 20.

The particle size corresponding to the limiting inertia is referred to as the cut-off size for the impactor. The cut-off size is dependent on the air flow, particle density, and impactor characteristics.

The deflected air flow 7 enters the exhaust chambers 21 that are located on either side of the collection chambers. The exhaust chambers are defined by the thin plates 22 of the neighboring receiving chambers 20, the retaining strips 16, and the end plates 13 and 14. The end plates 13 and 14 block the inlet portion of the exhaust chambers and thereby cause the air to flow initially in the direction indicated by the arrows 7.

Because the end plates 13 and 14 have slots 17 cut in the exit (lower) portion of the plates, the exhaust air flow is forced to turn and exit through the slots as shown by the exhaust flow 11. Thus the exhaust flow 11 is physically separated from the product flow 10 and allows for the efficient separation of the larger particles.

A separate flow control device is fluidly connected to the exhaust chambers and to the receiving chambers to control the exhaust flow 11 and the product flow 10. The flow through the exhaust chambers has less resistance than the flow through the receiving chambers.

FIG. 2 shows a cross section of view of a schematic of the virtual impactor 1. The inlet flow 4 containing particles approaches the multiple accelerating nozzle assembly 2 and is focused on the nozzle slits 5 by the beveled sides 3 which provide a smooth transition to the narrow slit nozzles 5. The flow from the accelerating nozzle slits 5 is then directed into the receiving chambers 20 with most of the air deflected around to the exhaust chambers 21. A blow-up of the accelerating nozzle, receiving chamber and exhaust chamber is shown in FIG. 3.

FIG. 3 shows the inlet flow 4 accelerated by the beveled sides 3 as the flow enters the accelerating nozzle 5 with a higher air velocity. The accelerated flow 24 is directed toward the receiving chamber 20, and a minor flow 25 enters the receiving chamber while the major flow 7 is deflected around the receiving chamber and into the exhaust chamber 21. Particles accelerated in the nozzle 5 that have a size greater than the cut-off size will enter the receiving chamber 20 and be carried through the chamber with flow 25 and exit the chamber with flow 10. The particles in the exhaust flow 7 are carried through the slots 17 out of the exhaust chamber 21 with flow 11.

Figure 4:
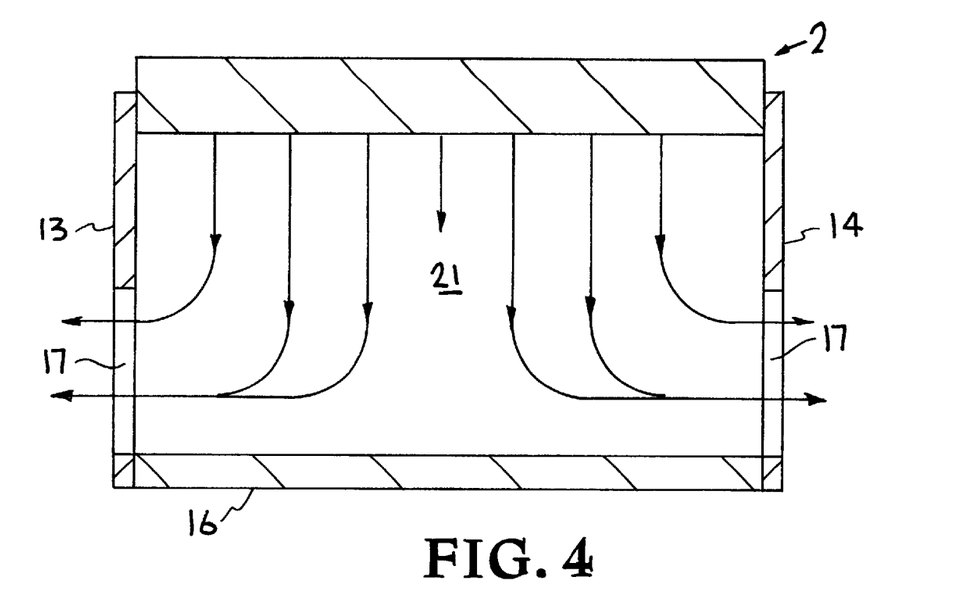

FIG. 4 shows a sectional view of the exhaust chamber taken along the lines A—A of FIG. 2. The arrows depict the direction and magnitude of the air flow in the exhaust chamber. Because the end plates 13 and 14 confine the exhaust flow to the lower portion of the chamber, the flow changes direction from a predominantly vertical flow to a horizontal flow. The exhaust particles are carried through the slots 17 out of the exhaust chamber 21.

Figure 5:
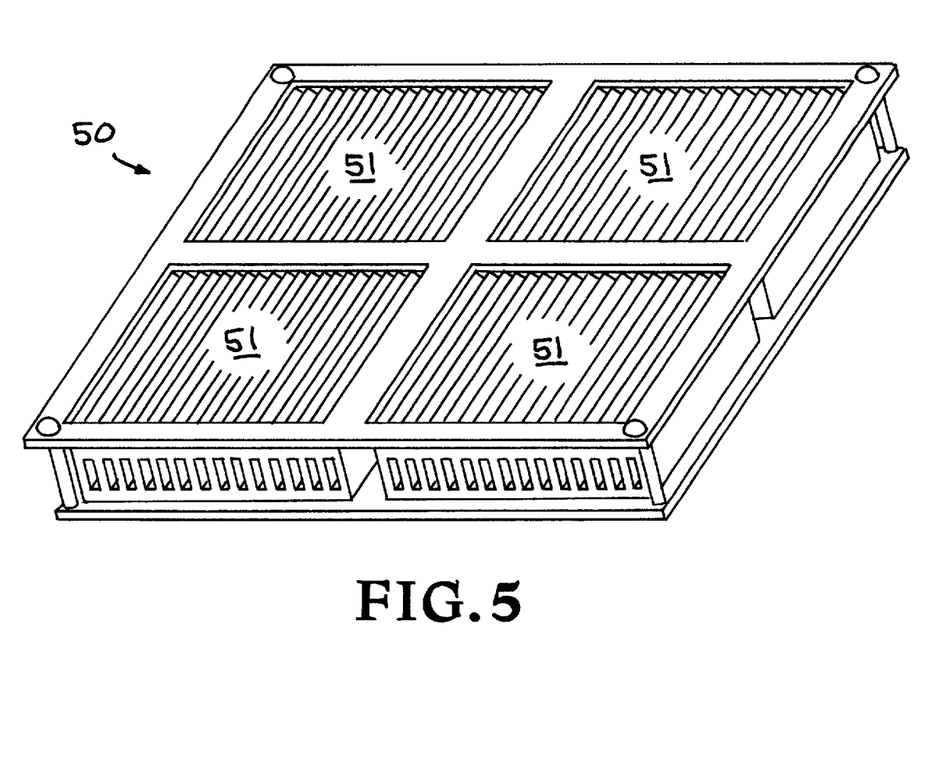

FIG. 5 illustrates a preferred embodiment of a virtual impactor 50 built in accordance with the present invention. The impactor 50 has overall dimensions of 8"×8"×1". The impactor 50 includes four individual, substantially identical sections 51. Each section 51 has dimensions of about 3.6"×3.7". Each individual section will maintain an essentially uniform air flow into the aligned nozzle inlets. The length of the slit inlet nozzle (3.6") maintains an essentially uniform inlet velocity along the length of the inlet nozzle slit. The sample air is pulled into the nozzles by the exhaust flow from the slit nozzles. The air flow into the slits will be highest near the exhaust ports and lowest near the center, furthest away from the exhaust flow. The inlet flow along the inlet nozzle therefore varies similar to the shape of a rope held at two ends. By keeping the length of the nozzle slit to approximately the selected length (3.6") or less, non-uniformity of the air flow into the nozzle jets is reduced.

The virtual impactor 50 includes multiple accelerating nozzles, multiple receiving chambers and multiple exhaust chambers, in a parallel slit and parallel plate configuration. There are 21 slit nozzles in each nozzle section 51, or 84 nozzles for the impactor 50. The length of each nozzle is 0.04", and the width is 0.02". Each nozzle slit is 3.6" long. A feature of the design of this virtual impactor is that there are more than 5 accelerating nozzles and corresponding receiving chambers and exhaust chambers per inch of width. The length of the slit nozzles are significantly greater than their width, more than 100 times greater.

This design allows for extremely compact design, minimal resistance to air flow and simplicity in construction. As a result, the multi-slit virtual impactor allows for significantly higher air flows at lower pressure drops than is possible with other virtual impactors.

Test results of a virtual impactor shown in FIG. 5 at an inlet air flow of 43 cfm showed the pressure drop in the product flow was 0.8 inches of water and 0.3 inches of water in the exhaust flow. In these tests, the major and minor flows were 32 and 11 cfm respectively. These values are far better than any of the previous virtual impactors and allow for air sampling at higher air flows, lower energy requirements and with smaller units than is possible with previous virtual impactors. Much better performance is expected after the virtual impactor design is optimized for maximum air flow and minimum pressure drop.

Tests were conducted to determine the aerosol losses in the virtual impactor using monodisperse DOS aerosols tagged with sodium fluorescene (SF). Monodisperse particles having diameters of 5.1, 5.4, 7.4, and 14.7 microns were generated using various concentrations of DOS/SF in ethanol in a TSI vibrating orifice generator, model 3450 (TSI, Minneapolis, Minn.). The experiment consisted of injecting the DOS/SF aerosols into a vertical test duct where 43 cfm HEPA filtered air passed through the virtual impactor.

The major and minor flows through the virtual impactor were achieved with a single blower after adding additional resistance to the major (exhaust) flow so the resistance in both paths was the same. The aerosols were injected at the top of the vertical duct and were well mixed with the filtered air prior to reaching the impactor. The impactor was operated for about 10 minutes, after which the virtual impactor was disassembled and rinsed with alcohol to remove any DOS/SF deposits. The rinses from the nozzle assembly, the multiple plates defining the receiving and exhaust chambers, and the bottom plate were analyzed for SF and compared to the total SF entering the impactor.

To determine the total SF entering the virtual impactor, a HEPA paper was placed over the inlet of the impactor and, following the exposure, rinsed off the deposits. Separate tests were conducted for each aerosol size. The rinses from the DOS/SF tests were analyzed and converted to percent of SF lost in the impactor for each of the impactor components and the total and are given in Table 1. Except for the 14.7 microm aerosol, the virtual impactor typically has less than 10% particle loss.

TABLE 1

| Component | Aerosol Diameter, microns | | | |
|---|---|---|---|---|
| | 5.1 | 5.4 | 7.4 | 14.7 |
| Nozzle Assembly | 2.6% | 9.9% | 3.4% | 17.7% |
| Receiving/Exhaust | 0.7% | 4.6% | 0.2% | 18.6% |
| Bottom plate | 0.6% | 0.3% | 1.9% | 0.5% |
| Total | 3.9% | 14.8% | 5.5% | 36.8% |

The virtual impactor was then tested in a typical application involving aerosol sampling. Particle collection devices are typically used to collect particles in either the minor or both major and minor flows. In the test example, a commercially available wetted cyclone aerosol collector was used to collect the particles from the minor flow from the impactor. The wetted cyclone from Research International (RI) had its own blower to pull 11 cfm from the exit of the receiving chambers of the virtual impactor. An additional pump was used to pull 32 cfm from the exhaust chambers of the virtual impactor. In this application, the virtual impactor functions to increase the concentration of the aerosols and thereby allow a greater number of particles collected or shorter collection times.

To evaluate the effectiveness of the virtual impactor, the rate of particle collection for the RI collector with the impactor was compared to the collection rate of the RI collector by itself. The particle collection rate was determined by first determining the collection efficiency of each system and then multiplying the efficiency by the particle sampling rate.

Various aerosols and test methods were used to determine the collection efficiency. Most of the data was obtained using heterodisperse dioctyl sebacate (DOS) aerosols generated with a Laskin nozzle generator (Virtis, Gardiner, N.Y.). The capture efficiency was determined with an aerodynamic particle sizer (APS) (TSI, Minneapolis, Minn.).

Two additional tests were performed on the impactor/RI collector system. One test consisted of using unlabeled 1.88 micron latex aerosols and measuring the aerosol concentration with the APS counter. Another test consisted of using flourescent labeled 2.0 micron latex aerosols and measuring the latex collected in liquid samples using a flow cytometer. An all glass impinger, AGI-30, was used to determine the challenge aerosol in the liquid measurements. The liquid measurements provided a more accurate efficiency determination than the aerosol measurements, because the particles in the RI collector are captured in the liquid sample. The efficiencies derived from the aerosol samples are expected to be higher, because particle losses in the system are counted as particles collected.

For the RI collector by itself, the aerosol collection efficiency was determined from the aerosol concentration measurements in the inlet and exhaust of the collector using the following equation:

$$E = 100(1 - C_e/C_i) \quad (1)$$

Where E=aerosol capture efficiency, %
  $C_e$=aerosol concentration in the exhaust
  $C_i$=aerosol concentration in the inlet
However, because there are one intake and two exhaust paths for the virtual impactor/RI collector system (one from the virtual impactor exhaust and a second from the RI unit), separate measurements of the aerosol concentration and the flow rates of each of the three paths must be taken to compute collector efficiency. The efficiency is determined from Equation 2:

$$E=100\{1-[V_{RI}C_{RI}+V_{IE}C_{IE}]/[V_I C_I]\} \quad (2)$$

where E=aerosol capture efficiency, %
C=aerosol concentration
V=air flow rate
RI=measurement at the exhaust of the RI unit
IE=measurement at the exhaust of the virtual impactor
I=measurement at the inlet of the virtual impactor
Equation 2 and the DOS and latex concentration measurements were used for determining the filter efficiency for the impactor/RI system.

For the liquid measurements, the number of particles in the AGI-30 sample was first corrected for the fraction of air sampled by the AGI-30 compared to that going into the virtual impactor before the efficiency was determined.

Figure 6:
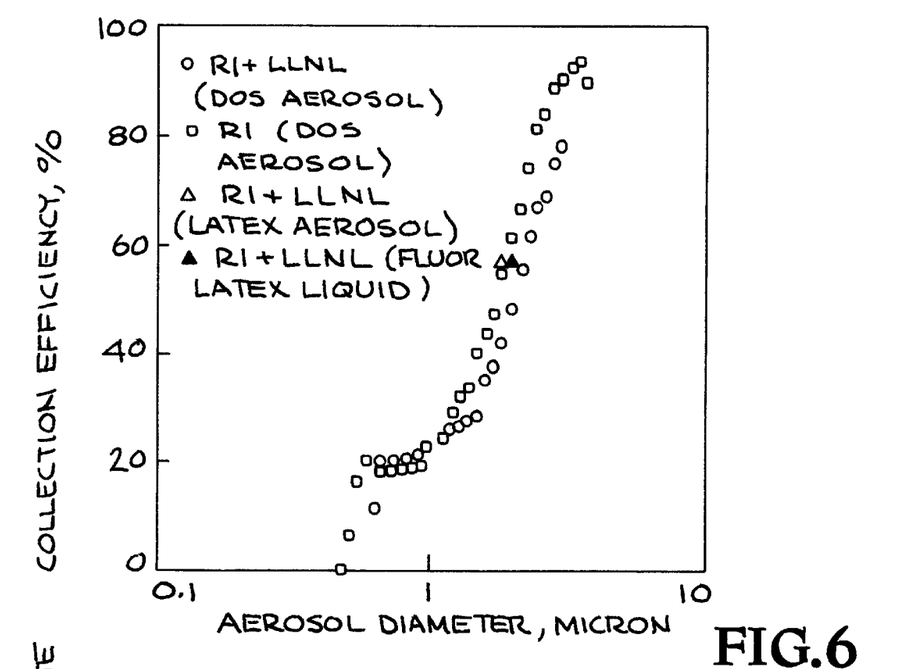

FIG. 6 shows graphs of the test results of the collection efficiency of a particle collection device with and without the multi-slit virtual impactor. FIG. 6 shows that the DOS collection efficiency for the impactor/RI collector is only slightly lower than the comparable efficiency for the RI collector alone. FIG. 6 also shows that the efficiency determined from the labeled latex particles collected in the liquid sample is comparable to the efficiency determined from DOS aerosol samples.

Figure 7:
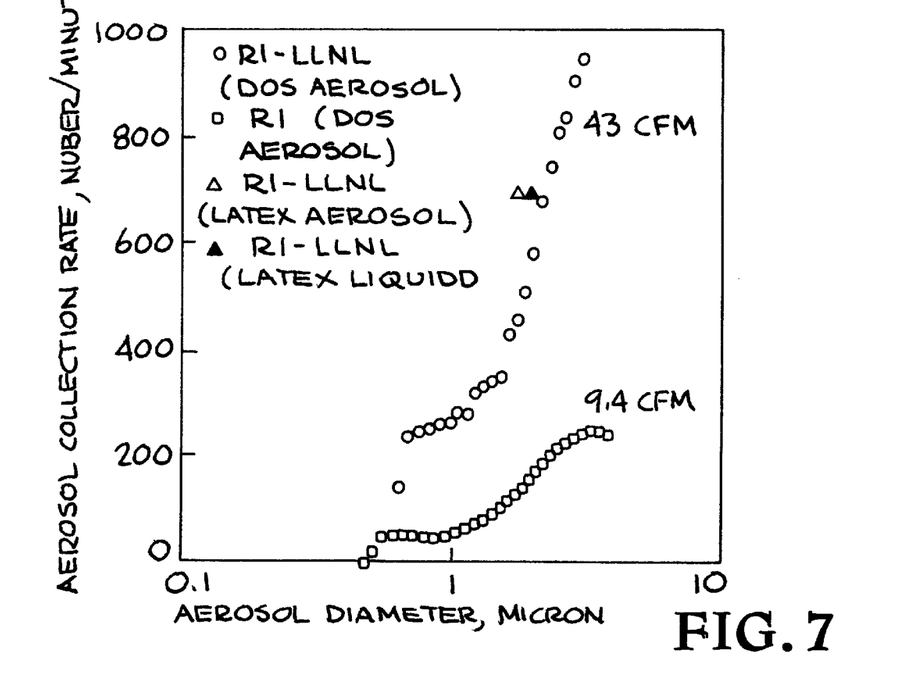
FIG. 7 shows graphs of the particle collection rate of the particle collectors from FIG. 5 with and without the multi-slit virtual impactor.

Since the rate of aerosol collection is the critical parameter in evaluating collector performance, the efficiency measurements in FIG. 6 were converted to the collection rates in FIG. 7. This is done by multiplying the collector efficiencies in FIG. 6 by the corresponding sample flow rates and the aerosol concentration (assumed 1 part/l). The results in FIG. 7 show that the aerosol collection rate of the impactor/RI collector is about four times that of the RI collector alone. This increased collection rate is due to the virtual impactor, that effectively concentrates the larger aerosols into a smaller air flow.

The simplicity of the multi-slit virtual impactor makes it attractive to make the units using micro-machining techniques. This is accomplished by constructing a multiplicity of slit nozzles from a plate, constructing a multiplicity of receiving chambers from a multiplicity of plates, and constructing a multiplicity of exhaust chambers from a multiplicity of plates. The receiving chambers are positioned downstream from the slit nozzles. The plate containing the slit nozzles, the plates that form the receiving chambers, and the plates that form the exhaust chambers are located so that there are a multiplicity of gaps between the slit nozzles and the receiving chambers. The size of the multiplicity of slit nozzles, the multiplicity of gaps, and the multiplicity of receiving chamber are selected so that the fluid flow will be separated into the first flow component containing particles essentially greater than a selected size which will be directed into said receiving and the second flow component containing particles essentially smaller than the selected size which will be directed into said exhaust chambers. The nozzles and other parts of the virtual impactor are constructed using micro-machining technology. This is possible because of the plate construction.

Although the dimensions of the components will scale to the micron level, the practical limitations are the maximum size of the particles to be sampled. The problem is to prevent particles from clogging the air paths. As an approximate rule of thumb, the air passages should be ten times the largest particle diameter. For example, if the maximum particle size is 10 microns, a practical upper limit for the accelerating nozzle is 100 microns. If the maximum particle size is 1 micron, the accelerating nozzle can be 10 microns.

Figure 8:
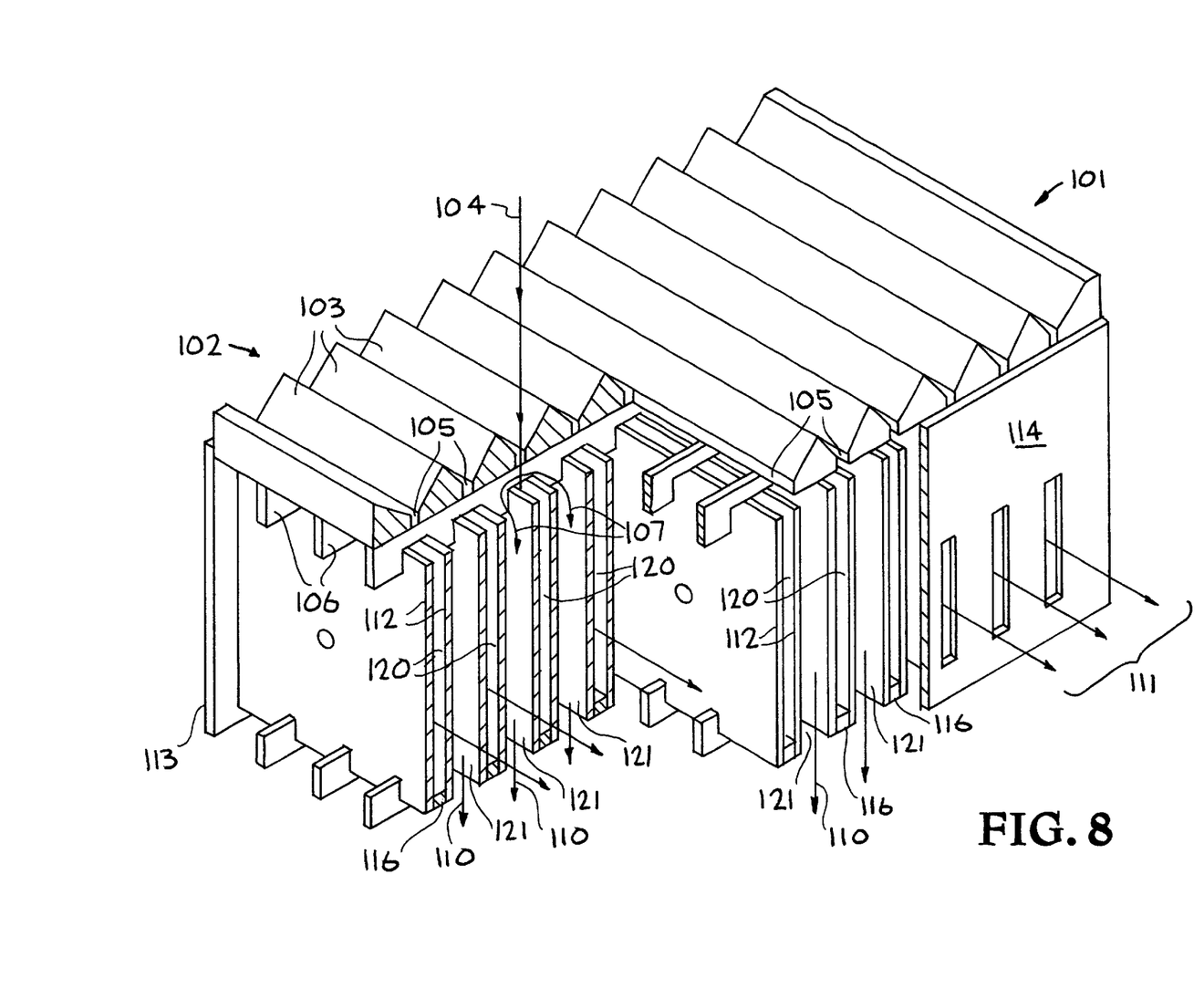
FIG. 8 is a perspective, partially sectioned, view of another embodiment of a virtual impactor system constructed in accordance with the invention.

FIG. 8 is a perspective, partially sectioned view of another embodiment of a virtual impactor 101 constructed in accordance with the invention. The virtual impactor 101 consists of the multiple accelerating nozzle assembly 102, the multiple receiving chambers 120, and the multiple exhaust chambers 121. A flow control device, not shown in FIG. 8, controls the air flow through the receiving and exhaust chambers. A separate flow control device is fluidly connected to the exhaust chambers and to the receiving chambers to control the exhaust flow and the product flow. The flow through the exhaust chambers has less resistance than the flow through the receiving chambers.

The inlet flow 104 containing particles approaches the multiple accelerating nozzle assembly 102 and is focused on the nozzle slits 105 by the beveled sides 103 which provide a smooth transition to the narrow slit nozzles 105. The purpose of the accelerating nozzles 105 is to provide a high velocity jet of air directed into the receiving chambers 120.

The receiving chambers are in-line and parallel to the accelerating jets and are separated from the jets by an air gap typically 1–3 times the width of the accelerating nozzle 105. The inlet width of the receiving chamber 120 is typically 1.3–1.5 times the width of the accelerating nozzles 105 so as to capture the accelerated jet.

Notched retaining guides 106 align the receiving chambers 120 with the accelerating nozzles 105 and provide for the air gap between the accelerating nozzles 105 and the receiving chambers 120. The receiving chambers 120 are defined by the thin plates 112 and by end plates 113 and 114.

Because the air flow through the receiving chambers 120 is much less than the air flow through the accelerating nozzles 105, most of the air flow from the accelerating nozzles will be deflected around the receiving chambers 120 and into the exhaust chambers 121. The outlet ends of the exhaust chambers 121 are open to allow the exhaust flow to pass through the exhaust chambers.

FIG. 8 shows the deflected air flows as arrows 107. Particles having an inertia greater than a given amount will not be able to deflect around the receiving chambers 120 and will be trapped in the receiving chambers 120. The particle size corresponding to the limiting inertia is referred to as the cut-off size for the impactor. The cut-off size is dependent on the air flow, particle density, and impactor characteristics.

The air flow 104 that enters the receiving chambers 120 will flow initially downward in the direction indicated by the arrow 104. The receiving chambers are defined by the thin plates 112, the retaining strips 116, and the end plates 113 and 114. Because the end plates 113 and 114 have slots cut in them, the slots provide an exit for the product flow 111. The product flow turns from the direction show as 104 and exits through the slots in the direction shown as 111 as shown by the arrows. The deflected air flow 107 enters the exhaust chambers 121 that are located on either side of the receiving chambers 120. The exhaust chambers are defined by the thin plates 122 of the neighboring receiving chambers 120 and the end plates 113 and 114. The inlet portion of the exhaust chambers causes the air to flow in the direction indicated by the arrows 107. The outlet ends of the exhaust chambers are open to allow the exhaust flow to pass through the exhaust chambers as shown by arrows 110. Thus the product flow is physically separated from the exhaust flow and allows for the efficient separation of the larger and smaller particles.

A single-stage virtual impactor has been described in the previous portion of this application. The present invention includes, creating a multi-stage virtual impactor to increase the particle concentration whereby the product flow from the preceding impactor becomes the inlet flow for the subsequent virtual impactor. In this configuration, each impactor stage has the same cut-off size and has the effect of increasing the particle concentration. Each stage has the effect of extracting the major fraction of the air while leaving the particles behind. By adding an additional impactor stage, the particle concentration in the product flow increases by the factor for each impactor stage.

For example, the single stage impactor that was built had a concentration factor of 4. A two-stage impactor having the same characteristics would have a concentration factor of 16, a three-stage, 64 and so on. In an experimental unit that was built, a concentration factor of 4 was utilized because the unit was not yet optimized. A typical virtual impactor concentrates particles in a fluid by a factor of 10, i.e. 10% of the total flow is the product flow and 90% is the exhaust flow. In this case the concentration increases by factors of 10 for each stage, i.e. 10, 100, 1000 etc.

The size of each subsequent stage of the multi-stage virtual impactor designed for increasing concentration is reduced proportionate to the product flow. For example, the experimental unit shown in FIG. 5 is 8"×8"×1" and has an inlet and product flow of 43 and 11 cfm respectively. A second stage virtual impactor would only need ¼ of the size to accommodate the 11 cfm and be 4"×4"×1". A third stage would be sized 2"×2"×1". In contrast, after the vitual impactor is optimized to have a concentration factor of 10, the second stage impactor would be 1/10 the size of the first stage.

Multi-stage virtual impactors can also be used to produce essentially monodisperse size particles with a narrow size range by directing the exhaust flow from the preceding impactor into the inlet of the second impactor. The second impactor must have a cut off size smaller than the first impactor. In this configuration, the product flow from the second impactor would contain particles with sizes between the cut-off size of the first and second stages. Since the second stage impactor must process the exhaust flow from the first stage, the second stage impactor is effectively the same size as the first.

For packaging efficiency, the first stage impactor would be configured as shown in FIG. 8 and be placed directly over the second sage impactor which is configured as shown in FIG. 1. Thus the exhaust flow from the first impactor is directed down into the inlet of the second impactor and yields the product flow at the bottom of the second impactor.

While particular embodiments, operational sequences for fabrication, materials, parameters, etc., have been set forth to exemplify and explain the principles of the invention, such are not intended to be limiting. Modifications and changes may become apparent to those skilled in the art, and it is intended that the invention be limited only by the scope of the appended claims.

The invention claimed is:

1. A method of separating a "particle containing" fluid flow into a first flow component containing particles essentially greater than a selected size and a second flow component containing particles essentially smaller than said selected size, comprising the steps of:

directing said fluid flow through a multiplicity of slit nozzles, positioning the slit nozzles so that the fluid flow is directed into a multiplicity of gaps, said gaps located between the multiplicity of slit nozzles and (a) a multiplicity of receiving chambers and (b) a multiplicity of exhaust chambers, locating the multiplicity of receiving chambers in alignment with the multiplicity of slit nozzles, locating the multiplicity of exhaust chambers offset from the aligned slit nozzles and the receiving chambers, selecting the multiplicity of slit nozzles, the multiplicity of gaps, and the multiplicity of receiving chamber inlets such that the fluid flow will be separated into the first flow component containing particles essentially greater than said selected size, which is directed into said receiving chambers, and the second flow component containing particles essentially smaller than said selected size, which is directed into said exhaust chambers.

2. The method of claim 1, wherein said first flow is a minor flow component directed into said receiving chambers and said second flow component is a major flow component directed into said exhaust chambers.

3. The method of claim 2, wherein said major flow component is more than 10 times said minor flow component.

4. The method of claim 1, wherein said receiving chambers are selected to be at least ten times the diameter of particles within said fluid flow.

5. The method of claim 1, wherein the slit nozzles have an orifice and the width of the orifice is less than 0.03 inches and the length of the orifice is greater than one inch.

6. The method of claim 1, wherein the fluid is air.

7. The method of claim 1, wherein the first flow component from said receiving chambers is processed again multiple times according to the steps of claim 1.

8. The method of claim 1, wherein the second flow component from said exhaust chambers is processed a second time according to the steps of claim 1 with the second time having a smaller selected size than the first.

9. A virtual impactor apparatus for separating a "particle containing" fluid flow into a first flow component containing particles essentially greater than a selected size and a second flow component containing particles essentially smaller than said selected size, comprising:

a multiplicity of slit nozzles, each slit nozzle having a slit nozzle axis;

a multiplicity of receiving chambers positioned downstream of the slit nozzles, each receiving chamber having a receiving chamber axis, each receiving chamber axis being aligned with a slit nozzle axis;

a multiplicity of gaps, each gap being located between a slit nozzle and a receiving chamber;

a multiplicity of exhaust chambers in fluid communication with said multiplicity of gaps, each exhaust chamber having an exhaust chamber axis offset from a slit nozzle axis and a receiving chamber axis; and the multiplicity of slit nozzles, the multiplicity of gaps, and the multiplicity of receiving chambers being such that the fluid flow will be separated into said first flow component containing particles essentially greater than said selected size, which will be directed into said receiving chambers, and said second flow component containing particles essentially smaller than said selected size, which will be directed into said exhaust chambers.

10. The virtual impactor apparatus of claim 9 wherein the nozzles have a nozzle orifice and the gaps are 1 to 3 times the width of the nozzle orifice.

11. The virtual impactor apparatus of claim 9 wherein the receiving chambers have an inlet and the width of the receiving chamber inlet is 1.3 to 1.5 times the width of the nozzle orifice.

12. The virtual impactor apparatus of claim 9 wherein there are more than 5 slit nozzles and corresponding receiving chambers and exhaust chambers per inch of width and the length of the slit nozzles is significantly greater than their width.

13. The virtual impactor apparatus of claim 9 wherein the length of the slit nozzles is at least 100 times greater than their width.

14. The virtual impactor apparatus of claim 9 wherein said multiple nozzles, said multiple receiving chambers, and said multiple exhaust chambers are arranged in a parallel slit and parallel plate configuration.

15. A method of constructing a virtual impactor for separating a "particle containing" fluid flow into a first flow component containing particles essentially greater than a selected size and a second flow component containing particles essentially smaller than said selected size, comprising:

constructing a multiplicity of slit nozzles from a plate, constructing a multiplicity of receiving chambers and exhaust chambers from a multiplicity of plates, positioning said receiving chambers and exhaust chambers downstream from said slit nozzles, providing a multiplicity of gaps between said slit nozzles, and said receiving chambers and exhaust chambers; and selecting the multiplicity of slit nozzles, the multiplicity of gaps, and the multiplicity of receiving and exhaust chambers such that the fluid flow will be separated into said first flow component containing particles essentially greater than said selected size which will be directed into said receiving chambers and said second flow component containing particles essentially smaller than said selected size which will be directed into said exhaust chambers.

16. The method of constructing a virtual impactor of claim 13, wherein the slit nozzles have an orifice width of less than 0.03 inches and an orifice length of greater than 1 inch.

* * * * *